United States Patent [19]

Dion

[11] Patent Number: 4,507,613
[45] Date of Patent: Mar. 26, 1985

[54] METHOD FOR IDENTIFYING NON-MAGNETIC MINERALS IN EARTH FORMATIONS UTILIZING MAGNETIC SUSCEPTIBILITY MEASUREMENTS

[75] Inventor: Eric P. Dion, Dallas, Tex.

[73] Assignee: Mobil Oil Corporation, New York, N.Y.

[21] Appl. No.: 434,443

[22] Filed: Oct. 15, 1982

[51] Int. Cl.³ .......................... G01V 3/36; G01V 3/28; G01N 27/72; G01R 33/16

[52] U.S. Cl. .................................. 324/340; 324/201; 324/377

[58] Field of Search ............... 324/201, 202, 323, 340, 324/345, 346, 377

[56] References Cited

U.S. PATENT DOCUMENTS

| | | | |
|---|---|---|---|
| 2,104,743 | 1/1938 | Herrick | 324/377 |
| 2,766,421 | 10/1956 | Wait et al. | 324/357 |
| 3,210,652 | 10/1965 | Seigel | 324/345 |
| 3,535,619 | 10/1970 | Franz et al. | 324/377 |
| 3,686,563 | 8/1972 | Walter | 324/377 |
| 3,882,375 | 5/1975 | Zemanek | 324/340 |
| 4,071,815 | 1/1978 | Zemanek | 324/340 X |

FOREIGN PATENT DOCUMENTS 212993 2/1958 Australia ............................ 324/345

*Primary Examiner*—Gerard R. Strecker
*Attorney, Agent, or Firm*—A. J. McKillop; M. G. Gilman; George W. Hager, Jr.

[57] ABSTRACT

A magnetic susceptibility log is run through an earth formation to identify the presence of any select non-magnetic minerals in association with magnetic minerals. The select non-magnetic mineral is identified as being present when the magnetic susceptibility measurement exceeds a level at which a measurable concentration of the select non-magnetic mineral is expected to be present.

2 Claims, 3 Drawing Figures

METHOD FOR IDENTIFYING NON-MAGNETIC MINERALS IN EARTH FORMATIONS UTILIZING MAGNETIC SUSCEPTIBILITY MEASUREMENTS

BACKGROUND OF THE INVENTION

Heavy minerals, such as platinum and gold, are often found in association with magnetic igneous rocks and are concentrated into placer deposits by chemical and physical weathering processes. Although such heavy minerals are not magnetic in themselves, they are frequently found in surface and subsurface deposits bearing magnetic minerals. For example, it is known that platinum and gold bearing placer mineral deposits often contain magnetite and chromite. The quantity of magnetite and/or chromite can be used as a prospecting guide for deposits enriched in platinum or gold.

Previous prospecting techniques for such heavy minerals have employed geochemical methods, primarily chemical analysis of core samples in the laboratory. Also magnetometers have been used to take advantage of the close association of platinum and gold with magnetite and chromite (see Introduction to Geophysical Prospecting, McGraw-Hill Book Company, Inc., New York, 1960, pages 315–316).

SUMMARY OF THE INVENTION

In a method of determining the presence of a select non-magnetite mineral associated with a magnetic mineral in an earth formation, magnetic susceptibility measurements are carried out on at least a sample of the earth formation. A level is established for the value of the magnetic susceptibility measurements above which the measurements indicate the presence of the select non-magnetic mineral and below which the measurements indicate the absence of the select non-magnetic mineral. The earth formation is identified as having platinum present when the magnetic susceptibility measurements exceed a level at which platinum is expected to be present in a measurable concentration.

DESCRIPTION OF THE PREFERRED EMBODIMENT

The present invention provides a method for precious metal identification based on magnetic content.

It has been found that core samples with more than about 25% magnetic minerals by weight also contain measurable amounts of the heavy, non-magnetic mineral platinum. The presence of such magnetic minerals does not specifically quantify platinum content, but it does predict the presence of platinum at a measurable level. The magnetic mineral fraction is predominately magnetite with an unknown proportion of chromite. The presence of magnetite and chromite is, therefore, an indication of the presence of platinum.

In accordance with the present invention, the magnetic mineral content of an earth formation or a sample of an earth formation is determined by measuring magnetic susceptibility.

Figure 1:
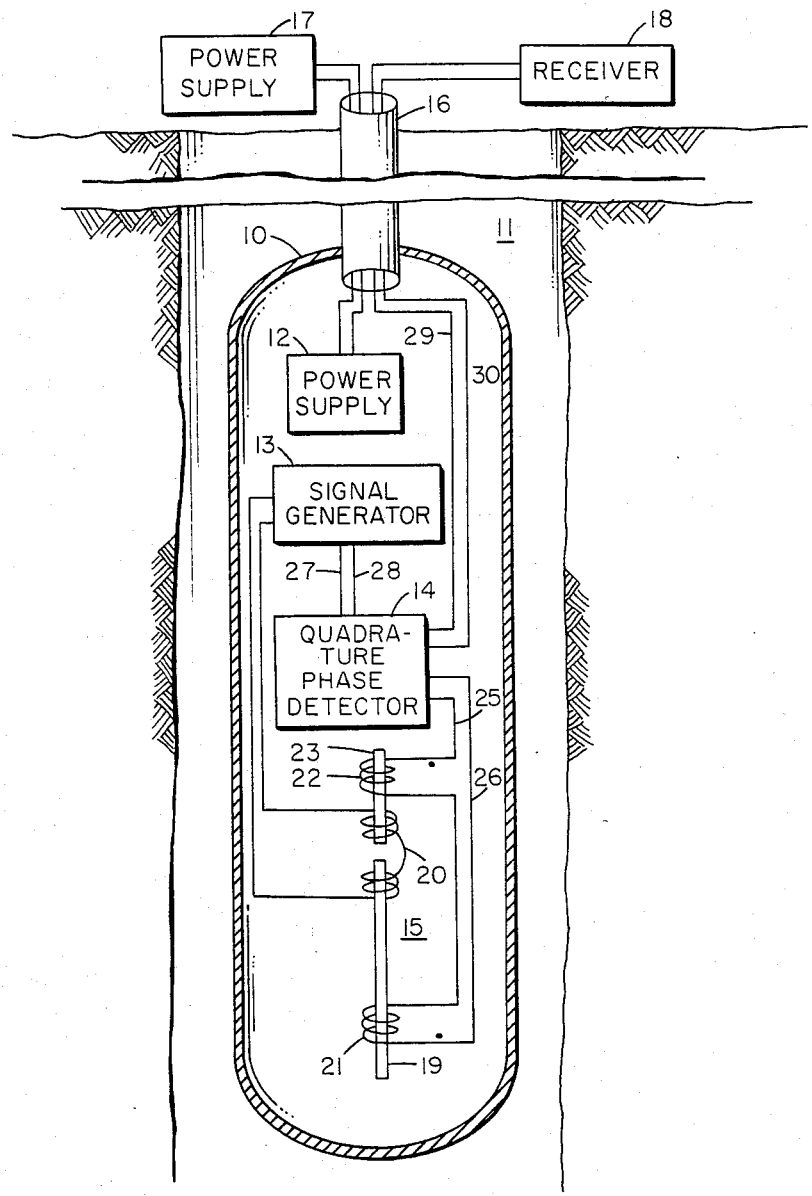
FIG. 1 is a diagrammatic representation of a logging tool in a borehole for use in carrying out magnetic susceptibility measurements.

A borehole logging tool such as set forth and described in U.S. Pat. Nos. 3,882,375 and 4,071,815, both to Joseph Zemanek, Jr., may be utilized to make the magnetic susceptibility measurements. Magnetic susceptibility is the phenomenon which occurs when a material placed in a magnetic field becomes magnetized. Susceptibility, defined quantitatively, expresses the ratio of the intensity of magnetization acquired by a substance to the strength of the magnetizing field acting on the body. A measurement of the magnetic susceptibility of earth deposits is, therefore, directly proportional to the content of ferromagnetic minerals. Briefly, FIG. 1 illustrates a logging tool 10 in which magnetic susceptibility measurements are carried out on the mineral deposits surrounding the borehole 11 by means of the signal generator 13, quadrature-phase detector 14, and the coil system 15. Briefly, a portion of transmitter coil 20 and a receiver coil 21 are wound about a magnetic core member 19; and the remaining portion of transmitter coil 20, along with a nulling coil 22, is wound about a magnetic core member 23. These two magnetic cores are coaxially mounted with respect to each other. The nulling coil 22 is connected in series opposition with the receiver coil 21 and is located close enough to the remaining portion of the transmitter coil 20 such that the total voltage induced across both the receiver and the nulling coils when the transmitter coil is energized with alternating current is representative of the electrical conductivity and magnetic susceptibility of the adjacent earth formation. The phase sensitive detector 14 distinguishes between an in-phase component and a quadrature-phase component of the induced voltage, the in-phase component being in phase with the transmitter coil current and the quadrature component being 90° out of phase with the transmitter coil current. The detector provides an output representative solely of the quadrature component. The frequency of the alternating current through the transmitter coil in such that the quadrature component of the induced voltage across the receiver and nulling coils is affected to a greater extent by the magnetic susceptibility of the formation surrounding the borehole than by the formation conductivity. Therefore, as the borehole tool 10 traverses the borehole, the detector 14 sends to the uphole receiver 18 by way of lines 29 and 30 signals representative of the magnetic susceptibilities of the formations surrounding the borehole.

Figure 2:
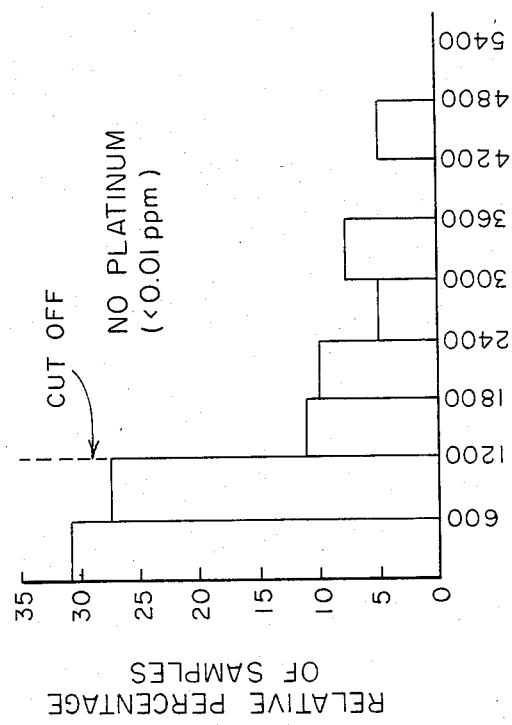
FIGS. 2 and 3 are histograms illustrating the frequency distribution of magnetic susceptibility measurements of magnetic mineral earth samples having non-measurable platinum and measurable platinum contents respectively.
Figure 3:
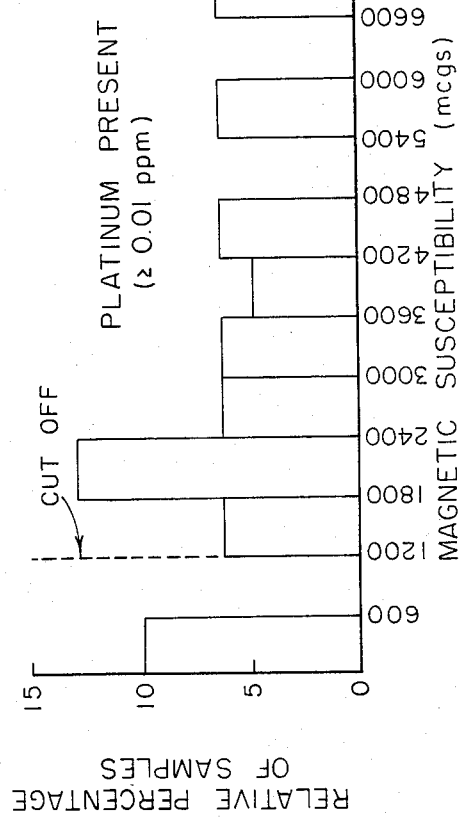

The histograms of FIGS. 2 and 3 show the distribution of magnetic susceptibility in core samples with no measurable platinum (less than 0.01 ppm) and with measurable platinum (at least 0.01 ppm), respectively. About 60% of the samples with non-measurable platinum have magnetic susceptibilities of less than 1200 $\mu$cgs units, while about 90% of the samples with measurable platinum have magnetic susceptibilities equal to or greater than 1200 $\mu$cgs units. Thus, by setting the cut-off value at 1200 $\mu$cgs units platinum identification, only 10% of the platinum bearing samples will be rejected as being non-platinum bearing while at least 60% of the non-bearing platinum samples will be rejected as being non-bearing. Such a cut-off value of 1200 $\mu$cgs will be solely unique to the core samples of the mineral deposits used in driving the histograms of FIGS. 2 and 3. Therefore a specified cut-off value will need to be selected for the core samples of the mineral deposit being analyzed.

The foregoing merely describes one embodiment of the present invention. It is to be understood that various modifications as well as alternate embodiments, may become apparent to one skilled in the art without departing from the scope and spirit of the invention as hereinafter defined by the appended claims.

I claim:

1. A method for determining the presence of a select non-magnetic mineral associated with a magnetic mineral in subsurface formations, comprising the steps of:
   (a) obtaining core samples from a plurality of subsurface formations known to contain a select non-magnetic mineral in the presence of a magnetic mineral,
   (b) measuring the non-magnetic mineral concentration of each of said core samples,
   (c) measuring the magnetic susceptibilities of the magnetic mineral content of said core samples,
   (d) preparing a first histogram of said magnetic susceptibility measurements of those of said core samples exhibiting non-magnetic mineral concentrations in excess of a selected number of parts per million,
   (e) preparing a second histogram of said magnetic susceptibility measurements of those of said core samples exhibiting non-magnetic mineral concentrations less than said selected number of parts per million,
   (f) selecting a cut-off level for said magnetic susceptibility measurements wherein at least a first percentage of said magnetic susceptibility measurements fall below said cut-off level along said first histogram and at least a second percentage of said magnetic susceptibility measurements fall above said cut-off level along said second histogram,
   (g) running a magnetic susceptibility log in a borehole extending through an earth formation in which the select non-magnetic mineral content is to be identified, and
   (h) identifying from said log those subsurface intervals along said borehole exhibiting magnetic susceptibility in excess of said selected cut-off level as subsurface formations containing said select non-magnetic mineral in concentrations in excess of said selected number of parts per million.

2. A method for identifying the presence of platinum associated with magnetic mineral in subsurface formations, comprising the steps of:
   (a) obtaining core samples from a plurality of subsurface formations known to contain platinum in the presence of a magnetic mineral,
   (b) measuring the platinum concentration of each of said core samples,
   (c) measuring the magnetic susceptibilities of the magnetic mineral content of each of said core samples,
   (d) preparing a first histogram of said magnetic susceptibility measurements of those of said core samples exhibiting platinum concentrations in excess of 0.01 parts per million,
   (e) preparing a second histogram of said magnetic susceptibility measurements of those of said core samples exhibiting platinum concentrations less than 0.01 parts per million,
   (f) selecting from said first and second histograms the magnetic susceptibility level wherein at least 60 percent of said magnetic susceptibility measurements on said first histogram fall below said level and wherein at least 90 percent of said magnetic susceptibility measurements on said second histogram fall above said level,
   (g) running a magnetic susceptibility log in a borehole extending through an earth formation in which the platinum content is to be identified, and
   (h) identifying from said log those subsurface intervals along said borehole exhibiting magnetic susceptibility in excess of said selected level as subsurface formations containing platinum in concentrations in excess of 0.01 parts per million.

* * * * *